Patented Nov. 8, 1949

2,487,278

UNITED STATES PATENT OFFICE 2,487,278

RUBBERY ISOOLEFIN COPOLYMER COMPOSITION OF IMPROVED COLD RESISTANCE

Winthrope C. Smith, Westfield, N. J., assignor to Standard Oil Development Company, a corporation of Delaware No Drawing. Application October 26, 1945,
Serial No. 624,957

3 Claims. (Cl. 260—30.6)

This invention relates to the use of suitable organic phosphates in compositions with olefinic copolymers, such as copolymers of isobutylene with a diolefin, to form vulcanizates of improved physical characteristics.

Rubber articles intended for use where low temperatures are encountered as in automobiles and airplanes are required to remain flexible at temperatures as low as −40° F. Special vulcanizates of natural rubber with certain sulfur ratios and certain accelerators have shown good flexibility at subzero temperatures. Certain vulcanizates of synthetic rubbery polymers, particularly the vulcanized olefinic copolymers of olefins with diolefins, have shown as good flexibility in comparison to natural rubber vulcanizates at moderately low subzero temperatures, but it has been found desirable to improve their low temperature flexibility still further to meet the stated requirements.

Improvement of low temperature flexibility of olefinic copolymer vulcanizates has to be obtained by a distinctive manner of compounding. In general, the rubbery olefinic copolymers do not need the mastication required by natural and relatively hard and dry synthetic rubbers in processing, and materials among those most useful as softeners to facilitate the processing of such rubbers do not have a desired effect on the physical properties of cured olefinic copolymers. Some of these softeners interfere with vulcanizates of the olefinic copolymers, and others have an adverse or no substantial favorable effect.

An object of this invention is to impart substantially improved cold resistance or low temperature flexibility to a vulcanizate of olefinic copolymers by incorporating a suitable phosphate ester.

A more specific object of this invention is to provide for utilization of relatively high molecular weight alkyl phosphates having 16 or more carbon atoms per molecule in alkyl radicals, for conferring on vulcanized olefinic copolymers of isobutylene with isoprene required flexibility at temperatures as low as −40° F. and lower without deleterious effects on other desirable physical properties of the vulcanizate.

The olefinic copolymers are polymeric materials synthesized by low temperature catalytic polymerization of an olefin, such as isobutylene, with a diolefin, such as isoprene. These copolymers have become known by the term "butyl rubber." Methods of manufacturing and compounding these materials are given in the U. S. Patent 2,356,128 of August 22, 1944, to R. M. Thomas and W. J. Sparks. Properties of these materials are further described in an article beginning on page 1282 of Ind. Eng. Chem., vol. 32, No. 11, October 1940.

Although procedures for the preparation of butyl rubber are described in the above-mentioned patent, a general method of preparation will be briefly outlined.

Butyl rubber is prepared by reacting a monoolefin, such as isobutylene, with a diolefin, such as isoprene, at a temperature below 0° C. in the presence of a Friedel-Crafts catalyst, such as aluminum chloride. The mono-olefin reactant is preferably used in a major proportion with respect to the diolefin. In a typical preparation, ½ to 20 parts of isoprene and 99½ to 80 parts of isobutylene are mixed with a solution of aluminum chloride dissolved in an organic solvent which forms no complex with the catalyst and is liquid at the reaction temperature. The reaction temperature is preferably in the range −50° C. to about −165° C. A useful solvent for the metal halide catalyst is an alkyl halide, such as methyl chloride or ethyl chloride.

The resulting olefinic copolymer is a tough, elastic product resistant to oxidation and chemical attack. It is characterized by low unsaturation, e. g., an iodine number below 50. Copolymers of this type have been estimated to have average molecular weights above 15,000 and often between 30,000 and 80,000. Butyl rubber can be processed on conventional rubber machinery. It becomes soft and plastic at roll temperatures of the order of 80° to 100° C. Vulcanization of the copolymers is effected by heating with sulfur and zinc oxide, and with other sulfurization aids as described in the above-mentioned patent, which also shows that other compounding agents, including certain fillers and softeners, may be employed.

Now in accordance with the present invention it is found that in order to impart improved cold resistance to the vulcanized olefinic copolymer product a specific type of agent must be used.

Ester derivatives of phosphoric acid now found to be particularly effective agents for increasing the cold resistance of butyl rubber or olefinic copolymer vulcanizates are such alkyl phosphates as di- and tri-octyl phosphates. In general, it appears the suitable alkyl phosphate should contain from 16 to 36 alkyl carbon atoms per molecule to arrive at satisfactory results. These alkyl phosphates may be obtained by esterifying phosphoric acid with higher alkanols having 8 to 12 carbon atoms per molecule, such as octanol, decanol, or dodecanol. Also, it is possible to use mixtures of such higher alkanols or mixtures containing an appropriate proportion of lower alkanols with the higher alkanols to obtain the suitable alkyl phosphates. From about 5 to 60 parts by weight of these suitable esters based on the weight of pure copolymer gum are to be incorporated with 100 parts by weight of the gum during compounding.

In determining the cold or freeze resistance qualities of the vulcanizates, a method termed "The envelope freeze test" was used. This is a very severe test conducted on samples of the vulcanizate stocks calendered on fabrics. In these tests a wide variety of addition agents were compared.

TEST PROCEDURE

A piece of the calendered fabric 4" x 6" is folded in half, with the rubber or vulcanizate coating on the inside. With the folded edge of this resultant 4" x 3" specimen at the bottom, the two bottom corners are folded again into two isosceles triangles 1½" x 1½" x 2" leaving a 1" portion of the original fold between them. The envelopes are placed in the cold box at the specified temperature with a 650 g. weight over the folds. After five hours the envelopes are snapped open as rapidly as possible in the cold box by grasping the top open ends. Cracking through to the fabric at the fold constitutes a failure.

Representative data on the vulcanizate formulation and test results are as follows:

The data illustrates how the organic phosphates, with increased size of alkyl radicals, confer greatly improved cold resistance on the vulcanizates. It is to be noted that the dioctyl and trioctyl phosphates with 16 and 24 alkyl carbon atoms in the alkyl radicals, respectively, give a considerable greater improvement than the other phosphates and that their incorporation into the vulcanizates accomplishes the objects of this invention. The triphenyl phosphate which contains no alkyl carbon atoms actually degrades the product. Phosphates represented by tricresyl and tributyl phosphates, both of which have less than 16 alkyl carbon atoms per molecule, give no substantial improvement with respect to freeze resistance.

A further test determines the flexibility and resilience imparted to the copolymer by the addition of the alkyl phosphates in terms of recovery and speed of recovery after compression.

The formula used is as follows:

| | |
|---|---|
| Copolymer _____parts__ | 100 |
| Zinc oxide _____do____ | 5 |
| Sulfur _____do____ | 2 |
| Tetramethyl thiuram disulfide _____do____ | 1 |
| Mercaptobenzothiazole _____do____ | 0.5 |
| SRF Black (Gastex) _____do____ | 50 |
| Alkyl phosphate _____volumes__ | 10 |

Molded cylinders 0.3" in diameter and 0.6" in height were cured of each stock for 60 minutes at 287° F. The test was conducted in a methanol bath at −20° F. using an ASTM asphalt penetrometer with a foot ¾" in diameter. Three samples were run and the results averaged on each stock. The slugs were preconditioned by cycling once through 20% compression, then being compressed 15% of their original height, held for ten minutes and released, taking recovery readings at 3, 5, 10, 20, 40, and 90 seconds.

*Formulae*

| | A | B | C | D | E | F |
|---|---|---|---|---|---|---|
| Isobutylene-Isoprene Copolymer | 100 | 100 | 100 | 100 | 100 | 100 |
| Zinc Oxide | 5 | 5 | 5 | 5 | 5 | 5 |
| Stearic Acid | 1 | 1 | 1 | 1 | 1 | 1 |
| Tuads [1] | 1 | 1 | 1 | 1 | 1 | 1 |
| Selenac [2] | 1 | 1 | 1 | 1 | 1 | 1 |
| Sulfur | 2 | 2 | 2 | 2 | 2 | 2 |
| Wax | 3 | 3 | 3 | 3 | 3 | 3 |
| Clay | 75 | 75 | 75 | 75 | 75 | 75 |
| Triphenyl Phosphate | | 15 | | | | |
| Tricresyl Phosphate | | | 15 | | | |
| Tributyl Phosphate | | | | 15 | | |
| Trioctyl | | | | | 15 | |
| Dioctyl Phosphate | | | | | | 15 |

| Cure 60' at 287° F. | A | B | C | D | E | F |
|---|---|---|---|---|---|---|
| Tensile-Elongation | 2,410–730 | 1,770–810 | 2,070–750 | 2,000–710 | 2,070–710 | 2,090–810 |
| Modulus at 300—Shore | 350– 45 | 60– 31 | 120– 30 | 120– 34 | 140– 30 | 160– 33 |

*Freeze resistance—Envelope test*

| | A | B | C | D | E | F |
|---|---|---|---|---|---|---|
| −20° F | OK | Bad Crease | OK | OK | OK | OK. |
| −40° F | Failed | Failed | Bad Crease | Bad Crease | OK | OK. |
| −50° F | | | Failed | Failed | Sl. Crease [3] | OK. |
| −60° F | | | | | Bad Crease | Sl. Crease. [3] |
| −70° F | | | | | Failed | Failed. |

[1] Tetramethyl thiuram disulfide.
[2] Selenium tetraethyl dithiocarbamate.
[3] Slight crease.

The following data were obtained:

| Time in Seconds | 3 | 5 | 10 | 20 | 40 | 90 |
|---|---|---|---|---|---|---|
| Recovery in per cent: | | | | | | |
| Control | 30.5 | 39.2 | 49.0 | 58 | 66 | 73 |
| Dioctyl Phosphate | 59.8 | 66 | 72.1 | 77.9 | 81.4 | 84.6 |
| Trioctyl Phosphate | 60.3 | 65.9 | 72.5 | 77 | 81 | 85 |

Thus the great increase in recovery and recovery rate at low temperatures brought about by the use of dioctyl and higher alkyl phosphates is demonstrated. This test is applicable to mechanical goods and inner tubes whereas the envelope test can be applied to proofed goods.

Advantageously, the cold resistant butyl rubber stocks improved by the higher alkyl phosphates remain light in color, have little or no odor, and have a low heating loss, resulting in retention of desired freeze resistance properties over long periods of time. These suitable phosphates do not destroy the normal tack of the butyl rubber, thus permitting normal building operations, and allowing good adhesion to fabrics. There was no evidence of bleeding from the uncured or cured stocks containing these phosphates, thus showing good compatibility. The tensile strength of the stocks is less affected by these higher alkyl phosphates than by the other phosphates or by other additives previously used. Also, they lower the modulus to a lesser degree than other additives.

The specially useful organic phosphates have accordingly been demonstrated to be esters of phosphoric acid in which hydrocarbon radicals contained at least 16 alkyl carbon atoms per molecule.

It is not intended that this invention be limited by the examples given for the purpose of illustration, since modifications thereof as set forth may be made without departing from the spirit and scope of the invention defined in the appended claims.

I claim:

1. A cold resistant vulcanizate of a synthetic rubber of 80 to 99½ parts of isobutylene and ½ to 20 parts of a conjugated diolefin copolymerized at a temperature between $-50°$ C. and $-165°$ C. by means of a Friedel-Crafts catalyst, the vulcanizate containing 100 parts by weight of said rubber and 15 parts by weight of an ester of phosphoric acid chosen from the class consisting of dioctyl phosphate and trioctyl phosphate.

2. A composition according to claim 1 in which the ester is dioctyl phosphate.

3. A composition according to claim 1 in which the ester is trioctyl phosphate.

WINTHROPE C. SMITH.

REFERENCES CITED

The following references are of record in the file of this patent:

UNITED STATES PATENTS

| Number | Name | Date |
|---|---|---|
| 2,293,673 | Hershberger | Aug. 18, 1942 |
| 2,325,982 | Sarbach | Aug. 3, 1943 |
| 2,349,412 | Douglas | May 23, 1944 |
| 2,406,802 | Carruthers | Sept. 3, 1946 |

FOREIGN PATENTS

| Number | Country | Date |
|---|---|---|
| 112,875 | Australia | Apr. 24, 1941 |